June 9, 1925.
J. T. COWLEY.
CONVEYER
Filed May 4, 1923
1,541,410
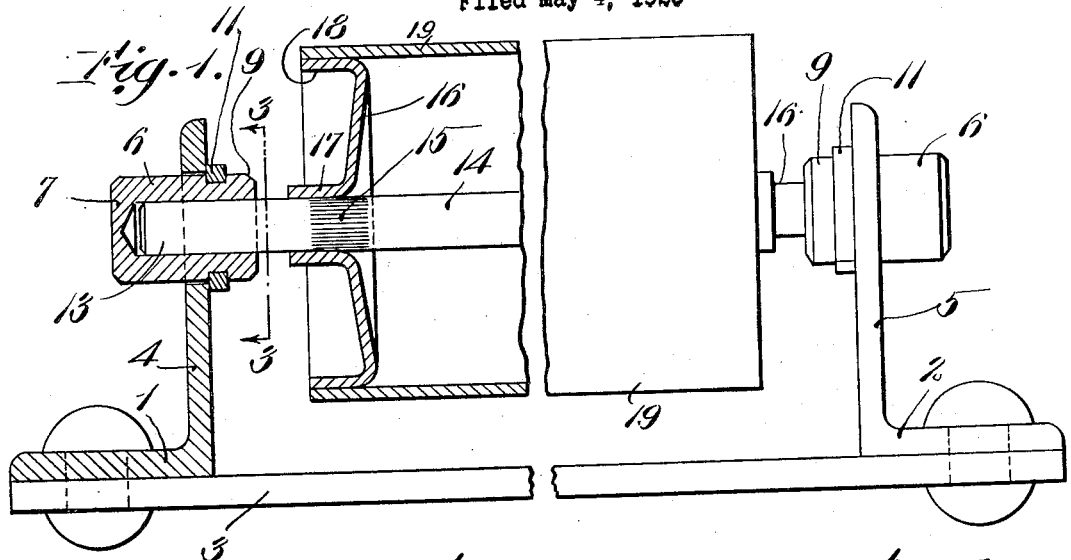
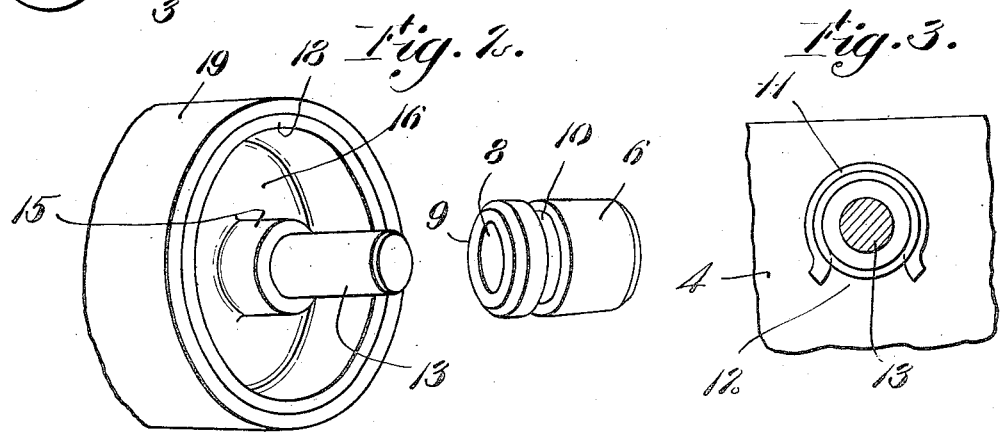
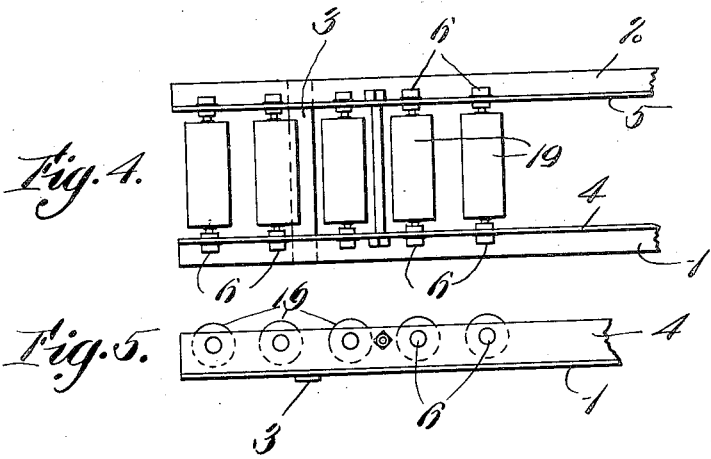
Inventor.
James T. Cowley
by Roberts Roberts & Cushman
Att'ys.

Patented June 9, 1925.

1,541,410

UNITED STATES PATENT OFFICE.

JAMES T. COWLEY, OF SYRACUSE, NEW YORK, ASSIGNOR TO THE LAMSON COMPANY, OF SYRACUSE, NEW YORK, A CORPORATION OF MASSACHUSETTS.

CONVEYER.

Application filed May 4, 1923. Serial No. 636,629.

*To all whom it may concern:*

Be it known that I, JAMES T. COWLEY, a citizen of the United States of America, and resident of Syracuse, in the county of Onondaga and State of New York, have invented new and useful Improvements in Conveyers, of which the following is a specification.

This invention pertains to conveyers of the gravity type in which a series of antifriction rollers is employed for supporting and guiding the articles to be transported, and relates more particularly to the construction of such rollers and the bearings for supporting them.

Principal objects of the invention are to provide a strong and durable roller of simple and cheap construction, together with enclosed, substantially dust-proof bearings therefor, so constructed and arranged that the roller may readily and quickly be installed in or removed from the chute.

In the accompanying drawings:—

Fig. 1 is an end elevation, partly in vertical section, of a conveyer constructed in accordance with the present invention;

Fig. 2 is a disassembled fragmentary perspective of one of the rollers forming a part of the conveyer, together with a bearing for the roller spindle;

Fig. 3 is a fragmentary vertical section on the line 3—3 of Fig. 1;

Fig. 4 is a fragmentary plan view of the conveyer to smaller scale; and

Fig. 5 is a side elevation of the parts shown in Fig. 4.

The conveyer as herein disclosed preferably comprises a pair of substantially parallel spaced angle bars 1, 2, respectively held in proper relative position by suitable spacer bars 3. These angle bars comprise the vertically disposed flanges 4, 5, respectively, each provided with a series of openings, the openings of the respective flanges being disposed oppositely to each other.

Bearings 6, consisting of sleeves closed at one end 7 to form elongate cups, are received within the openings in the vertical flanges. Each bearing is furnished with an axial bore 8 which opens at one end 9 of the bearing. At a point adjacent to the open end of the bearing, a circumferential groove 10 is provided, preferably of substantially rectangular cross section. This groove receives a resilient snap ring or split collar of horse shoe shape, also preferably of rectangular cross section to fit snugly in the groove which is divided at the point 12 to permit it to be snapped over the bearing into the groove in the latter. This collar when in position in the groove projects beyond the outer surface of the bearing to a sufficient extent to serve as a stop, thereby limiting axial movement of the bearing in one direction in the opening in the angle bar, the cross section of the collar being such as to prevent it from slipping out of the groove if the spindle is subjected to end thrust.

The opposite ends 13 of a roller spindle 14 are received in the bores of the oppositely disposed bearings of a pair, such bores constituting journal openings for the ends of a shaft or spindle. The bearing cups substantially exclude dust from the journals of the rollers, and may, if desired, be made of some antifriction metal, thus greatly reducing wear and prolonging the life of the spindles.

The spindle 14 is provided at points 15, 16 respectively, adjacent to the opposed bearings, with external ribs extending in a generally axial direction. Such ribs may conveniently be formed by a knurling or similar operation. A roller head 16 is disposed adjacent to either end of the spindle. Each head is furnished with a sleevelike portion 17 at its center having a bore of a diameter such as to provide a force or driving fit between such sleeve and the knurled portion of the shaft. Each head is also furnished with a circumferential flange 18 with which the respective ends of a shell 19 are secured in any suitable manner, as for example by spot welding or brazing.

The heads of the rollers are secured to the shaft in the manner above indicated by forcing them over the end of the shaft until the sleeve member 17 engages the ribbed portion of the shaft, such engagement holding the heads rigidly in fixed position upon the shaft so that no additional securing means is necessary. Preferably the knurled portions of the shaft are so disposed that they fail to extend entirely through the sleeves 17, as such an arrangement provides greater resistance to axial movement of the spindle relatively to the heads if subsequently subjected to end pressure. After the heads have been positioned the outer shell 19 is slipped over them and secured in the manner above suggested.

In mounting a roller in the supports provided by the flanges 4, 5, a bearing 6 may if desired be placed in the openings in one flange, as for example the flange 5, and the collar 11 is snapped into the groove in such bearing, the collar engaging the inner surface of the flange. One end of the roller spindle is then passed through the opening in the opposite flange 4, thus permitting its other extremity to be pushed into the open end of the bearing in the flange 5. The other bearing is then slipped over the first mentioned end of the shaft from the outside of the flange 4 and when it has been properly positioned in the opening in the flange 4, its snap ring 11 is placed in its groove so as to prevent its withdrawal from the opening.

As the remote ends of the bearings are closed the bearings can not be moved axially inward toward the roller, due to the engagement of their closed ends with the ends of the spindle so that the bearings are thus securely retained in desired position. If, however, it be desired to remove a roller for any purpose, this is readily accomplished by removing one or both of the snap rings 11 from its bearings whereupon such bearings may be moved axially from off the ends of the spindle allowing the latter freely to be removed.

While the angle irons 1, 2, form convenient supports for the bearings it is clear that the invention is not in any manner dependent upon the employment of such members but that any other desirable form of support for the bearings may be substituted therefor if desired.

I claim:

1. A conveyer comprising a support having an opening therein, a bearing sleeve removably mounted in the opening, said sleeve having an axial journal opening for the reception of a roller spindle and being provided with a circumferential groove in its outer surface, and a resilient split collar normally seated in said groove and constituting a stop to limit axial movement of the sleeve in one direction.

2. A conveyer comprising a support having an opening therein, a bearing removably mounted in the opening, a roller shaft journalled in the bearing and constructed and arranged to limit axial movement of the bearing in one direction, said bearing having a groove of angular cross section in its outer surface, and a removable member of angular cross section normally resiliently engaging said groove and arranged to prevent axial movement of the bearing in the opposite direction.

3. In combination with a roller conveyer, a roller bearing comprising a sleeve like cup having one end closed and provided with a circumferential groove of substantially rectangular cross section near its opposite end, and a removable split collar of substantially rectangular cross section normally fitting snugly in said groove.

4. A conveyer comprising a pair of spaced substantially parallel plates having aligned openings, a bearing cup seated within each opening, the remote ends of said cups being closed and their adjacent ends projecting toward each other beyond the opposed faces of the respective plates, the projecting portion of each cup having a peripheral groove, a removable collar seated in each groove and projecting radially from the latter to prevent outward movement of the cup, and a shaft having its opposite ends journalled in the respective cups and preventing movement of said cups toward each other.

Signed by me at Syracuse, N. Y., this 27th day of April 1923.

JAMES T. COWLEY.